(12) United States Patent
Moorman et al.

(10) Patent No.: US 8,965,652 B2
(45) Date of Patent: Feb. 24, 2015

(54) ADAPTIVE CONTROL OF A FLOW CONTROL SOLENOID

(71) Applicant: GM Global Technology Operations LLC, Detroit, MI (US)

(72) Inventors: Steven P. Moorman, Dexter, MI (US); David H. Vu, East Lansing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/916,761

(22) Filed: Jun. 13, 2013

(65) Prior Publication Data

US 2014/0371998 A1 Dec. 18, 2014

(51) Int. Cl.
*G06F 7/00* (2006.01)
*B60W 10/10* (2012.01)
*B60W 10/30* (2006.01)

(52) U.S. Cl.
CPC ............... *B60W 10/10* (2013.01); *B60W 10/30* (2013.01)
USPC ......... 701/68; 701/60; 192/48.601; 192/82 T; 192/85.63

(58) Field of Classification Search
CPC . B60W 10/02; B60W 10/023; B60W 10/026; B60W 2050/0008; B60W 2050/0012; B60W 2050/0014; B60W 2050/0026; B60W 2510/0291; B60W 2510/107; B60W 2510/0225; F16D 48/062; F16D 48/08; F16D 25/14; F16D 25/10
See application file for complete search history.

(56) References Cited

U.S. PATENT DOCUMENTS

| | | | | |
|---|---|---|---|---|
| 6,089,364 | A | * | 7/2000 | Kunii .......................... 192/85.63 |
| 8,738,257 | B2 | * | 5/2014 | Moorman et al. .............. 701/68 |
| 8,740,748 | B2 | * | 6/2014 | Moorman et al. ............ 477/174 |

* cited by examiner

*Primary Examiner* — David D Le
(74) *Attorney, Agent, or Firm* — Quinn Law Group, PLLC (57) ABSTRACT

A vehicle includes an engine, a transmission, and a controller which executes a method. The transmission includes a clutch having an actuator which applies the clutch using position-based control logic. The transmission also includes a fluid pump and a variable-force or other solenoid valve positioned downstream of the pump and upstream of the clutch. The valve outputs a flow rate (Q) for a corresponding solenoid control current (I). The controller adapts a calibrated Q vs. I characteristic table of the valve for different transmission temperatures by applying closed-loop position control signals to the actuator at the different transmission temperatures and recording a null point(s) describing the corresponding solenoid control current (I) at a zero flow rate condition. The controller calculates an offset value for solenoid control current (I) using the recorded null point(s), applies the offset value to the characteristic table, and controls the clutch using the adapted characteristic table.

19 Claims, 5 Drawing Sheets

ADAPTIVE CONTROL OF A FLOW CONTROL SOLENOID

TECHNICAL FIELD

The present disclosure relates to the adaptive control of a flow control solenoid.

BACKGROUND

Vehicle power transmissions come in a variety of configurations, including automatic, manual, dual-clutch, and automated manual transmissions. The clutches of a typical automatic and manual/standard transmission are applied via clutch pistons, which are actuated using hydraulic fluid circulated at relatively low pressures. Due to the low pressure construction of automatic transmissions, hysteresis tends to be minimal. As a result, automatic transmissions are controlled primarily via pressure-based feedback control logic.

By way of contrast, a dual-clutch transmission (DCT) and an automated manual transmission (AMT), both of which combine certain features common to manual and automatic transmissions, operate at higher pressures. As a result, DCTs and AMTs are more prone to the effects of hysteresis. Such transmissions are therefore often controlled via position-based control logic, wherein a particular position is commanded and monitored for the clutch piston as opposed to a particular pressure. All of the transmissions described above may use variable force solenoid valves to control hydraulic pressure and flow to a given actuator.

SUMMARY

A vehicle is disclosed herein having an engine, a transmission, and a controller. The transmission includes a clutch, such as an input clutch of a dual-clutch transmission or an automated-manual transmission, which is applied via a clutch actuator using position-based commands. Hydraulic flow from a pump to the clutch is controlled via a flow-control solenoid valve. In the example embodiments described herein, this valve is a flow control variable force solenoid (VFS) valve, although other solenoid valves may be used. The electrical current command for the solenoid valve is determined by the controller via reference to a calibrated flow vs. solenoid electrical control current (Q vs. I) characteristic table.

As is known in the art, valve manufacturers typically provide such a table, with the table referenced to a particular operating temperature such as 50° C. However, the flow characteristics of a solenoid valve may differ markedly from the supplier-provided Q vs. I characteristic table, for instance in the presence of cold or hot fluids. Likewise, valve use rates, transmission temperature swings, seal degradation rates, and the like can vary from system to system, thus resulting in a variable level of valve performance between different systems. The present approach is intended to align the characteristic table with a valve's actual performance in an adaptive manner, as set forth in detail herein. The controller of the present disclosure periodically updates or adapts this calibrated Q vs. I characteristic table over time for different transmission temperatures, and thus provides optimal shift control accuracy and a reduced level of clutch wear.

Position-based control logic may be relatively sensitive to accumulated error, which can develop over time between actual solenoid valve performance and that which is expected from the calibrated Q vs. I characterization table. Underlying the present approach is the recognition that such errors are highly temperature dependent. Performance variation may therefore develop over time in a given solenoid valve, a result which may hold even in fluid circuits having an otherwise identical design.

The controller of the present invention selectively applies closed-loop position control signals, e.g., via a proportional-integral-derivative (PID) logic, when the clutch is not otherwise in use. In so doing, the controller learns the actual electrical characteristics of a given valve at zero flow conditions. If the Q vs. I characteristic table is a sufficient match to the actual valve performance, an appreciable amount of steady-state error will not develop. However, when the Q vs. I characteristic table does not match the actual valve performance, the proportional control will reach a commanded flow where the QVFS valve delivers zero flow. Since no flow is delivered, the clutch position, error, and commanded flow rate will remain the same. Thus, the controller can adjust the electrical current axis of the Q vs. I characteristic table to ensure that zero flow corresponds to the proper learned current value. Such an approach provides an advantage relative to, for instance, a heavy reliance on integral control to correct the steady-state error. The aggressive use of such an alternative step can result in position oscillations which may degrade control precision.

In various embodiments, a vehicle, transmission, and method are disclosed. The vehicle includes an engine, the transmission, and a controller. The controller executes recorded instructions only under predetermined conditions, such as when in a park state, when the engine is off, or when using a particular input clutch, depending on the configuration of the transmission. The controller applies closed-loop position control signals to the clutch actuator at two or more transmission temperatures, and records, at the different transmission temperatures, a null point describing the corresponding solenoid control current (I) of the solenoid valve at a zero flow rate (Q=0) condition. The controller also calculates an offset value for the corresponding solenoid control current (I) using the recorded null point, and applies the offset value to the calibrated Q vs. I table. The clutch is thereafter controlled via the adapted Q vs. I table. All of these steps may be captured in logic and executed as part of the associated method.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
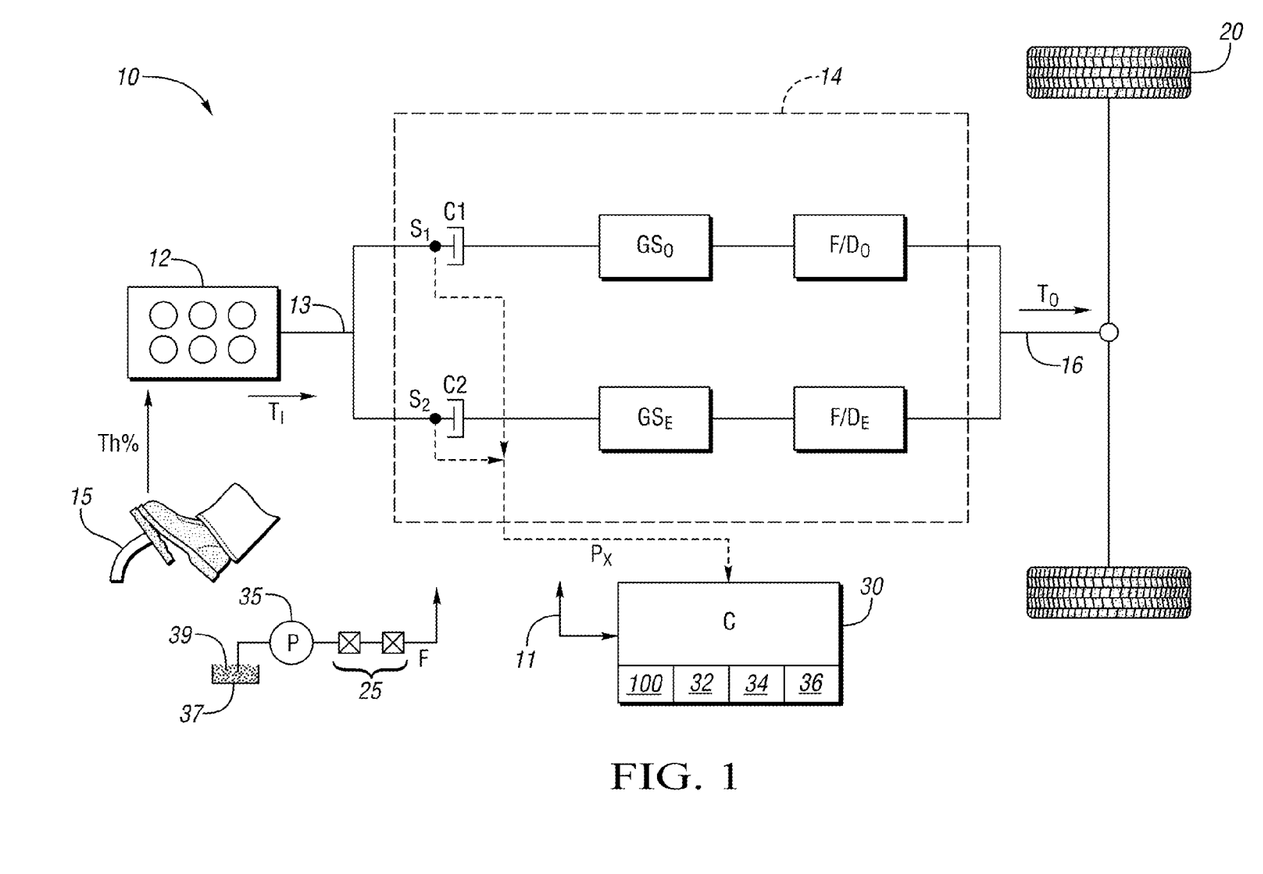
FIG. 1 is a schematic illustration of a vehicle having a transmission and a controller which adapts a flow rate vs. electrical current characteristic table of a flow-control solenoid valve according to the present disclosure.

Referring to the drawings, wherein like reference numbers refer to like components throughout the several Figures, an example vehicle 10 is shown schematically in FIG. 1. The vehicle 10 includes an internal combustion engine 12, a transmission 14, and a controller (C) 30. The engine 12 generates engine torque in response to receipt of the throttle request (arrow Th %), e.g., from an accelerator pedal 15. Engine torque is delivered as an input torque (arrow $T_I$) to the transmission 14 via a drive shaft 13.

The controller 30 is a computer hardware and software device that is configured, i.e., programmed and constructed to execute, without modification, computer code embodying steps of a method 100. In this manner, the controller 30 periodically adapts, i.e., adjusts or modifies over time, a calibrated flow vs. electrical control current (Q vs. I) characteristic table (T) for a given flow-control solenoid valve 25, e.g., a variable force solenoid (QVFS), with the table (T) recorded in memory 34 of the controller 30 or otherwise readily accessible to a processor 32 of the controller 30. In this manner, the controller 30 may provide improved accuracy and control over shift maneuvers of the transmission 14. An approach for doing this is set forth in detail below with reference to FIGS. 2-7.

Within the scope of the present invention, the transmission 14 may be any transmission that uses position-based controls in lieu of pressure-based controls in its operation. As such, the types of transmission 14 contemplated herein are more subject to the effects of hysteresis, thus requiring position control as a matter of course. Example transmissions 14 of this type may include dual-clutch transmissions (DCTs), automated-manual transmissions (AMTs), and the like. For illustrative consistency, the example of a DCT will be described hereinafter as the example transmission 14.

As is well understood in the art, a DCT includes two independently-operated, non-lubricated input clutches, which are shown in FIG. 1 as respective first and second input clutches C1 and C2. It will be appreciated that an AMT is effectively a DCT having just one input clutch, and therefore the AMT is also shown in FIG. 1 by disregarding one of the input clutches C1 or C2. While omitted from FIG. 1 for illustrative clarity, each input clutch C1 and C2 may include a center plate containing any number of spaced friction discs, friction plates, or other suitable friction materials. The input clutches C1 and C2 are selectively compressed together via a corresponding fluid-actuated clutch piston or other suitable clutch actuator(s), with these pistons having an axial position used in the overall control of the input clutches C1 and C2.

Fluid 39 may be drawn from a sump 37 and circulated to the input clutches C1, C2 via a fluid pump (P) 35, with the fluid pressure provided by the pump 35 represented in FIG. 1 by arrow F. Associated electronic and hydraulic clutch control devices (not shown) ultimately control shift operations of the transmission 14 in response to instructions or commands from various onboard controllers as explained in detail below.

In the example transmission 14 of FIG. 1, the first input clutch C1 may be used to connect the engine 12 to any of the oddly-numbered gear sets ($GS_O$) of the transmission 14, for instance to establish first, third, fifth, and seventh gears in an example 7-speed transmission, while the second input clutch C2 connects the engine 12 to reverse or any of the evenly-numbered gear sets ($GS_E$), e.g., second, fourth, and sixth gears in the same example 7-speed transmission. Using this type of gear arrangement, the transmission 14 can be rapidly shifted through its available range of gears without completely interrupting the power flow from the engine 12.

The transmission 14 may also include a pair of final drive assemblies ($F/D_O$, $F/D_E$) and an output shaft 16 connected to a set of drive wheels 20. The output shaft 16 ultimately transmits output torque (arrow $T_O$) from the transmission 14 to the drive wheels 20 in order to propel the vehicle 10. The final drive gear sets $F/D_O$, $F/D_E$ provide any required final gear reduction, and are connected to the output shaft 16 as shown.

The controller 30 of FIG. 1 may be embodied as microprocessor-based computing devices having the processor 32, tangible, non-transitory computer-readable media or memory 34 including but not necessarily limited to read only memory (ROM), random access memory (RAM), electrically-erasable programmable read-only memory (EEPROM), flash memory, etc., and any required circuitry. The circuitry may include high-speed clocks, analog-to-digital (A/D) circuitry, digital-to-analog (D/A) circuitry, a digital signal processor or DSP, transceivers 36 configured to transmit and receive any required signals (double-headed arrow 11) during the overall control of the transmission 14, and the necessary input/output (I/O) devices and other signal conditioning and/or buffer circuitry.

The controller 30 is programmed to execute the required steps of shift control logic, e.g., feed-forward, PID-based position control, over the designated input clutches C1 and C2. Ultimately, the controller 30 outputs a position control signal, separately or as part of the control signals (double-headed arrow 11), to the designated input clutch C1 or C2 to thereby set the position of the designated input clutch C1 or C2. The same controller 30 receives position feedback signals (arrows $P_X$) from clutch position sensors $S_1$, $S_2$. As used herein, the term "position control" thus refers to the control of the axial or linear position of a clutch apply piston or other actuator device needed for applying the input clutch C1 or C2, with closed-loop control established on the position via the position feedback signals (arrows $P_X$) as is known in the art.

Still referring to FIG. 1, the pump 35 delivers the fluid 39 under pressure to a designated clutch, e.g., the input clutch C1. One or more solenoid valves 25 may be disposed between the pump 35 and the input clutches C1, C2. For example, the pressurized fluid flow (arrow F) may first enter a pressure-control variable force solenoid (PVFS) valve, which may be controlled to limit the hydraulic pressure to the input clutches C1, C2. Upon exiting the PVFS valve, the pressurized fluid flow (arrow F) may enter a flow-control variable force solenoid (QVFS) valve. The controller 30 may communicate with these solenoid valves 25 via a controller area network (CAN) bus or other suitable control link to thereby control the shift operation involving the particular clutch involved in the present shift action.

As is known in the art, a typical solenoid valve used for flow control in an automotive transmission is a QVFS spool valve, which of the two solenoid valves 25 shown in FIG. 1 may be positioned furthest downstream from the pump 35. An electrical control current is delivered to the windings of the QVFS valve to move an internal spool and thereby command a given exhaust or feed flow, with this relationship captured for a calibrated reference temperature, usually by the valve manufacturer, in a calibrated flow vs. electrical current (Q vs. I) characteristic table, i.e., the table T shown in FIG. 1. This current command can be normalized so as to range, for instance, from 0 to 1 Amps (A).

The relative position of the spool within the QVFS valve may be commanded by a given electrical control current. For example, an electrical control current in the range of 0-0.5 A may correspond to a particular exhaust flow out of the QVFS valve, while a control current in the range of 0.5-1 A may correspond to a commanded fluid feed to the clutch being controlled, e.g., the input clutch C1. In practice, however, a discrete band exists in between the exhaust and feed current ranges. This band is referred to as a "no-flow" or "null" zone. It is recognized herein that null characteristics of a given solenoid valve can change with changing transmission temperatures. Adaptive control that considers the observed changes to the null zone is therefore the subject of the present invention, and is now described in detail with reference to the remaining Figures.

Figure 2:
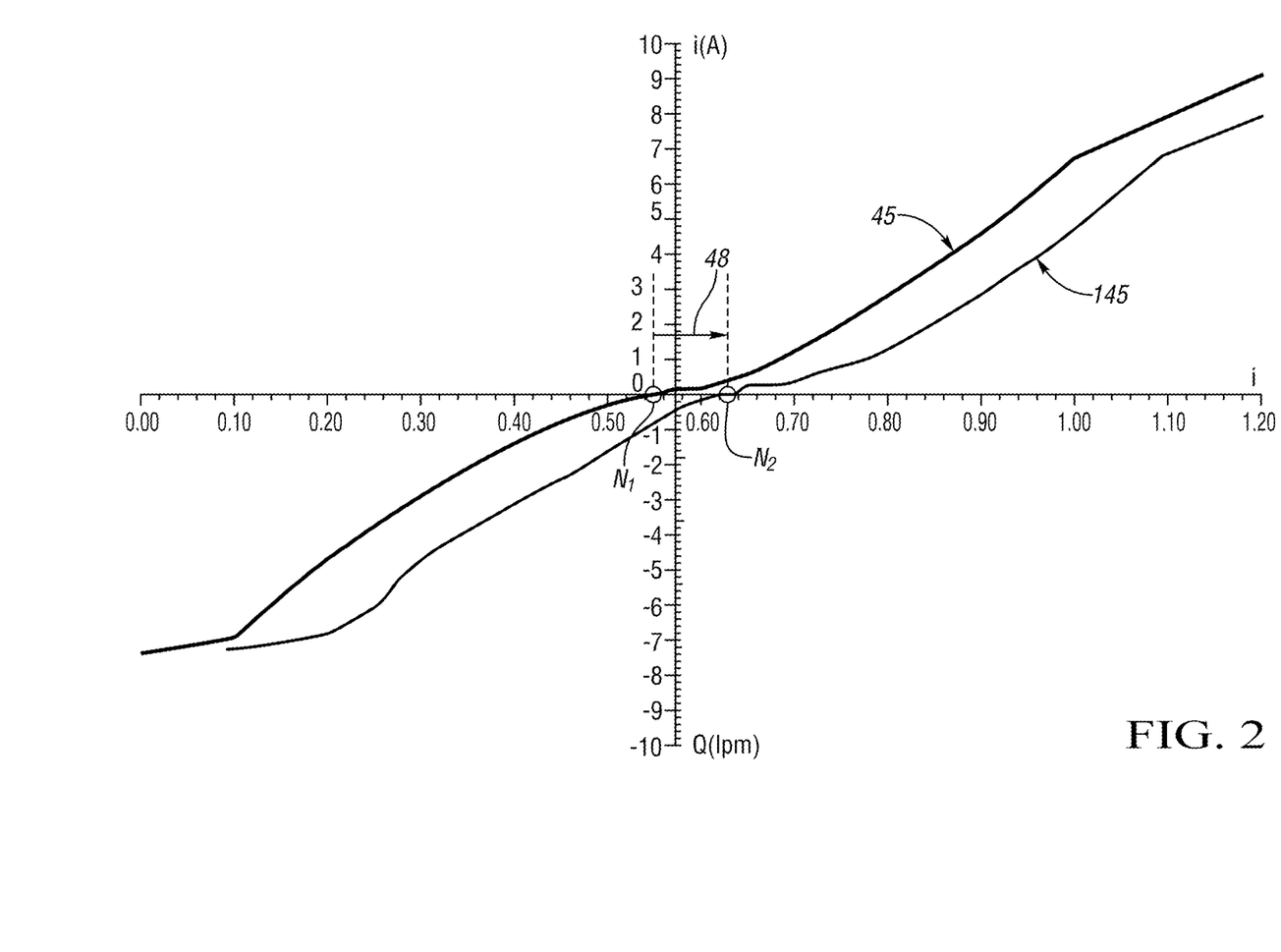
FIG. 2 is a schematic graphical illustration of example flow rate vs. electrical current characteristic curves describing shifting null/no-flow points for a solenoid valve as shown in FIG. 1, wherein solenoid electrical control current (I) and flow rate (Q) are plotted on the respective horizontal and vertical axes.

Referring to FIG. 2, traces 45, 145 describe an example Q vs. I characteristic performance. The information contained in the trace 45 is ordinarily captured in a table and provided by the manufacturer of the QVFS valve. Flow rate (Q) is plotted on the vertical axis, e.g., liters per minute, while the solenoid electrical control current (i) is plotted on the horizontal axis in amps (A). The trace 45 has a single null point ($N_1$), and is tied to a specific baseline temperature, e.g., 50° C., i.e., a typical warm decreasing current characteristic. However, this characteristic curve may in fact shift over with changing temperature. Trace 145 shows one possible shift of null point $N_1$. The new null point ($N_2$) shows that a slight increase in electrical current is required at zero flow relative to trace 45. This realization drives the present method 100.

Figure 3:
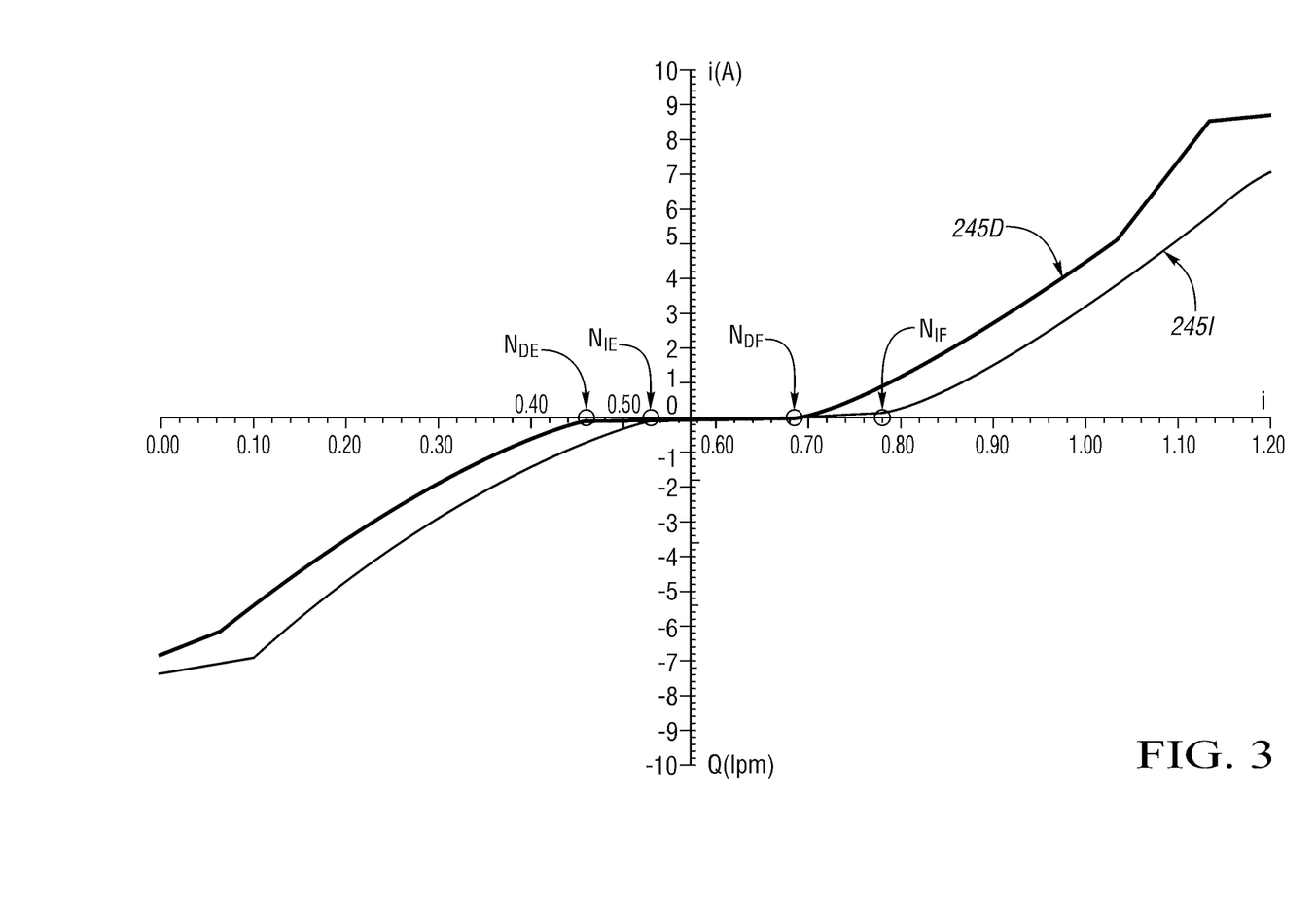
FIG. 3 is a schematic illustration of alternative example flow rate vs. electrical current characteristic curves describing shifting multiple null/no-flow points for the solenoid valve shown in FIG. 1.

Referring to FIG. 3, in the presence of colder fluids, which is not considered in conventional characteristic tables, the null zone can spread out in both directions for a given flow direction. This is primarily due to lower fluid leakage and viscous drag occurring in the QVFS valve. Traces 245D and 245I depict the characteristic traces for decreasing (D) and increasing (I) current directions through the QVFS valve, respectively. For trace 245D, null points $N_{DE}$ and $N_{DF}$ represent the null points for exhaust and feed flow, respectively. Likewise, null points $N_{IE}$ and $N_{IF}$ represent the respective null points for exhaust and feed flow for trace 245I, for an increasing current. Thus, there are four null points for this particular condition. The locations of these null points ($N_{IE}$, $N_{IF}$, $N_{DE}$, and $N_{DF}$) with respect to the x axis can vary, as in FIG. 2, with changing fluid temperature.

Figure 4:
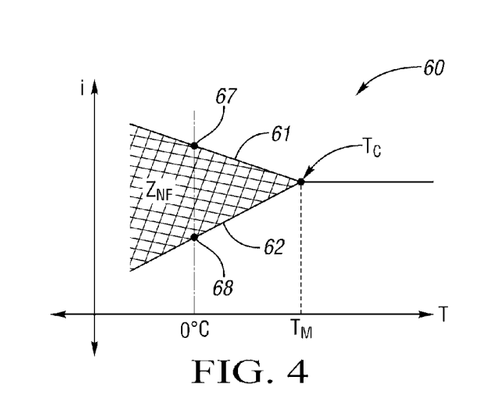
FIG. 4 is a schematic graphical illustration of an example null zone and characteristic temperature, with temperature (T) plotted on the horizontal axis and solenoid electrical control current (i) plotted on the vertical axis.

Referring to FIG. 4, traces 60 demonstrate the concept of a convergence temperature ($T_C$), which is used in the execution of the present method 100 as described below with reference to FIG. 5. The solenoid control current (i) is plotted on the vertical axis and temperature (T) is plotted on the horizontal axis. Trace 61 represents the I vs. T trace during fluid feed to a clutch, e.g., input clutch C1 of FIG. 1, while trace 62 represents the same relationship during the exhausting of the same clutch. The null zone is represented by shaded area $Z_{NF}$. This is a zone in which fluid does not flow to or from the QVFS valve.

Above the convergence temperature $T_C$, the QVFS valve will allow some amount of fluid to leak past its seals at all times, and thus a zero net clutch flow condition exists only at a single position or current value where the leakage into and out of a clutch circuit are equal. As a result of this, the controller 30 of FIG. 1 must be aware, at all times, of the boundaries of the null zone, or of the particular band between traces 61, 62 at a given temperature, e.g., between points 67 and 68 at T=0° C.

The controller 30 thus executes the method 100 to effectively learn the specific Q vs. I characteristics of given solenoid valve at a given temperature (T). It is recognized herein that the current Q vs. T temperature relationship, as shown in FIG. 4, is for the most part linear. Thus, learning of the specific Q vs. I characteristics at a small set of temperatures allows the controller 30 to normalize these results to any other temperature. For instance, just two temperatures may be used to determine the required slope for null shifting, as described below with reference to FIG. 7. That is, once the temperature is known for zero flow, this information may be used by the controller 30 to offset the Q vs. I characteristic curve. This control approach will now be described with reference to the remaining Figures.

Figure 5:
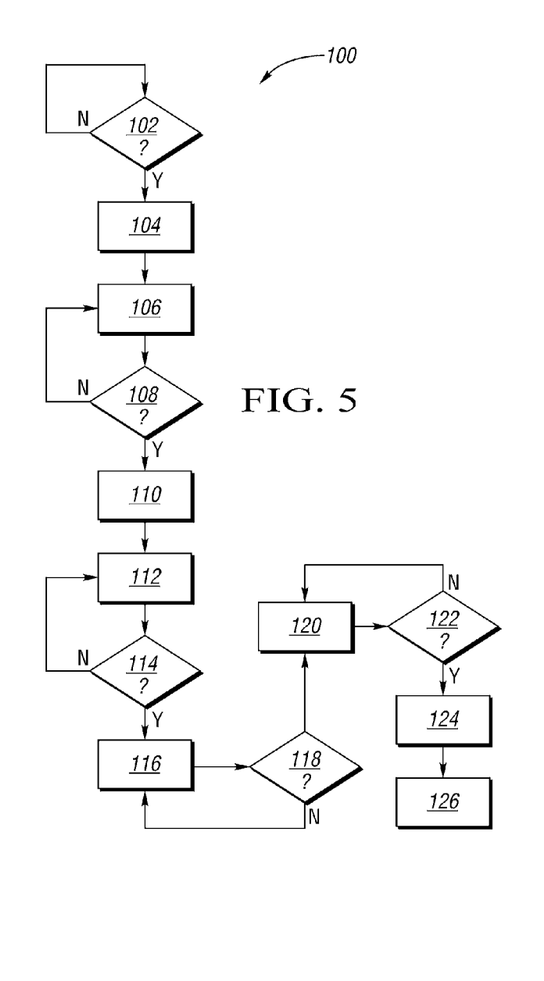
FIG. 5 is a flow chart describing an example method for adaptively controlling the solenoid valve of FIG. 1.

FIG. 5 describes an example embodiment of the method 100. Step 102 includes detecting whether predetermined conditions are satisfied for executing the remaining steps of the method 100. This may change depending on the design of the transmission 14 being used. For instance, in a DCT, the controller 30 of FIG. 1 could evaluate the input clutch C1 when the input clutch C2 is in use, and vice versa, or it could wait until the engine 12 is not running. For an AMT, the controller 30 could perform the method 100 when the transmission 14 is in a park (P) setting. The method 100 may be used only below the convergence temperature $T_C$, as described above with reference to FIG. 4, in another possible embodiment. The method 100 proceeds to step 104 only when the predetermined conditions suggest that it is appropriate to do so.

At step 104, the controller 30 initiates position control of the designated clutch, e.g., the input clutch C1. Position commands may be transmitted to the input clutch C1. Again, the particular clutch being analyzed is not at the same time used for other purposes. The method 100 then proceeds to step 106.

Step 106 entails stepping the solenoid control current (i) for the solenoid valve at a calibrated, gradual rate, and then monitoring the linear position of the clutch for movement of the clutch. The method 100 then proceeds to step 108.

Figure 6:
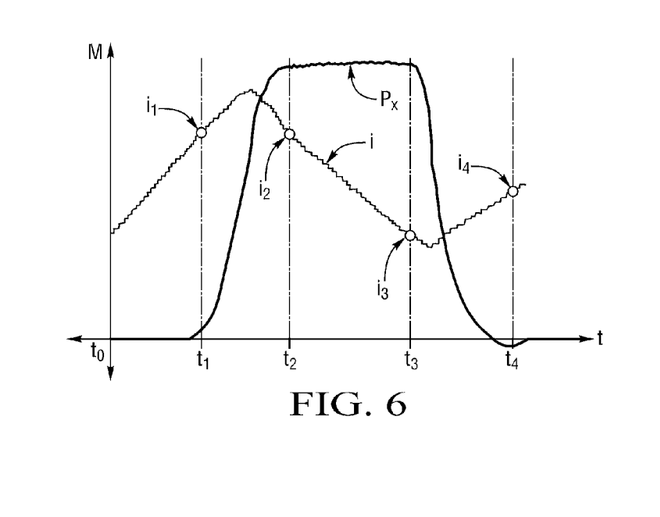
FIG. 6 is a schematic graphical illustration of a set of traces describing aspects of the method of FIG. 5.

At step 108, the controller 30 determines whether the clutch has reached an inflection point, i.e., has overcome seal friction and begun to move. This may be determined via the clutch position signals ($P_X$) of FIG. 1. In FIG. 6, which plots the magnitude (M) of the solenoid control current (i) and the clutch position from the position feedback signals ($P_X$) on the vertical axis over time (t) on the horizontal axis, this movement first occurs at time $t_1$.

Once this movement is detected, the controller 30 proceeds to step 110 and records the control current ($i_1$), which corresponds to the null point for the increasing feed direction. The method 100 then proceeds to step 112.

At step 112, the controller 30 next decreases the solenoid electrical control current (i), as shown in FIG. 6, and ramps this value downward in a gradual, controlled manner while monitoring the value of the clutch position signal ($P_X$). The method 100 then proceeds to step 114.

Step 114 includes determining whether the value of the clutch position signal ($P_X$) has stopped increasing, which corresponds to time $t_2$ in FIG. 6. Step 112 is repeated until this occurs, at which point the method 100 proceeds to step 116.

Step 116 includes recording the corresponding current value ($i_2$), which is the null point for the decreasing feed direction, and continues to decrease the control current (I), and then proceeding to step 118.

At step 118, the controller 30 determines whether the clutch has again started to move. If so, the method 100 proceeds to step 120. Otherwise, step 116 is repeated.

Step 120 is executed when movement is detected at step 118. Such movement occurs in FIG. 6 at $t_3$. The controller 30 thus records the value of the solenoid control current $i_3$ at t3, which corresponds to the decreasing exhaust null point, and then proceeds to step 120.

At step 120, the controller 50 again increases the solenoid control current (i) at a calibrated rate and proceeds to step 122.

Step 122 includes determining whether the clutch position signal ($P_X$) has stopped decreasing. This occurs at $t_4$ in FIG. 6. If the clutch position stops decreasing, the method 100 proceeds to step 124. Otherwise, step 122 is repeated.

Step 124 entails recording the corresponding solenoid control current ($i_4$) from step 122, which corresponds to the increasing exhaust null point. The method 100 then proceeds to step 126.

At step 126, the collected null data is used by the controller 30 of FIG. 1 to adjust the Q vs. I characteristics of the QVFS valve for the clutch that is being analyzed. This will now be described with reference to FIG. 7.

Figure 7:
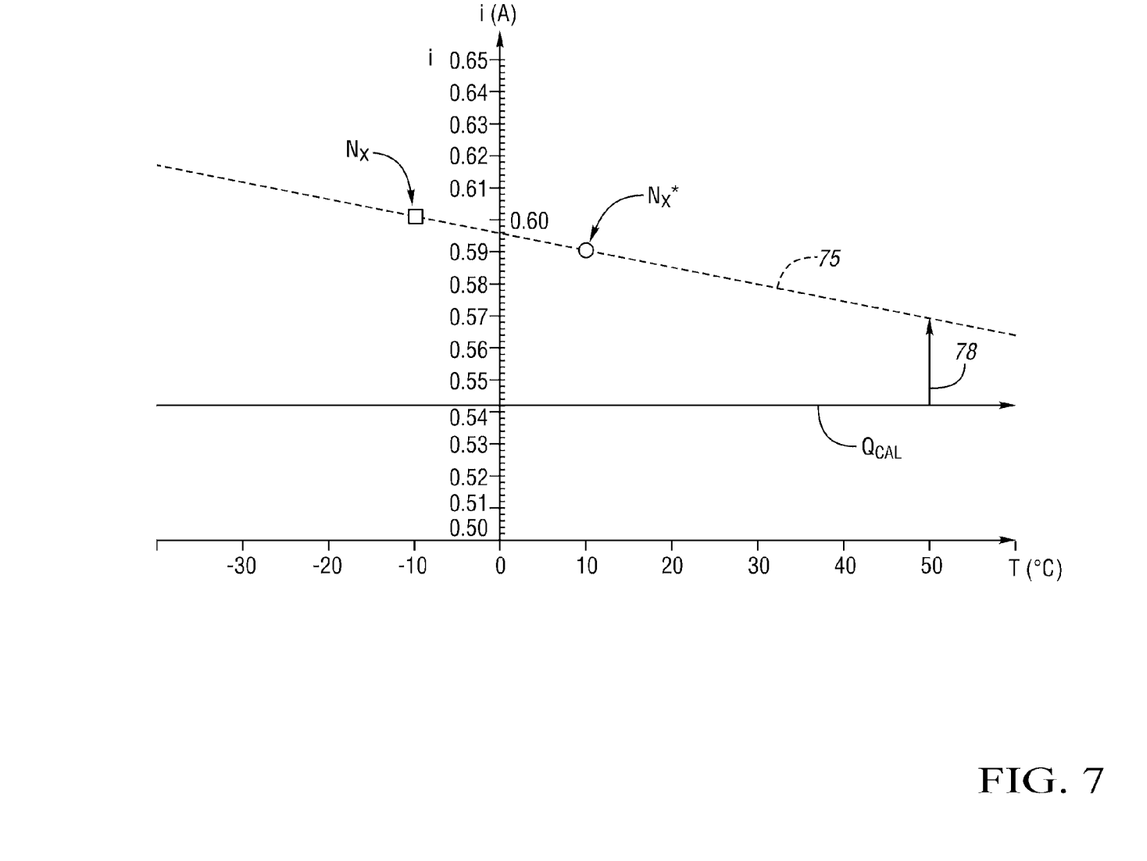
FIG. 7 is a schematic graphical illustration of example solenoid valve null points vs. temperature traces describing a null shift that may be used as part of the method shown in FIG. 5.

FIG. 7 is a plot of the solenoid control current (i) v. temperature (T), shown here in ° C., for example null points $N_X$ and $N_X^*$, which may be learned as set forth above with reference to FIGS. 5 and 6. The solenoid control current (I) is plotted on the vertical axis, while transmission temperature (T) is plotted on the horizontal axis. Line QCAL describes the calibrated solenoid control current for zero flow at a calibrated temperature, e.g., 0.54 A at 50° C.

Line 75 is plotted via the controller 30 during execution of the method 100. Only two points are needed to determine the slope of this line, and thus the forgoing method 100 may be used at two different temperatures to provide all of the data needed to complete the method 100.

Arrow 78 shows the null offset. That is, the controller 30 can calculate the difference between line 75 and line QCAL at the reference temperature T=50° C. After the offset has been determined, step 126 of FIG. 6 includes applying the offset to the Q vs. I characteristic curve/table described above, with a different offset applied to normalize each of the increasing feed, increasing exhaust, decreasing feed, and decreasing exhaust null points to the reference temperature provided by the manufacturer of the QVFS valve. Because the slope of line 75 is known, offsets for every temperature are available via simple calculation, and are thus readily applied by the controller 30 of FIG. 1 in real time to adapt the calibrated Q vs. I curve/table.

Therefore, the controller 30 as described above may be used to optimize clutch control in a position controlled transmission. The controller 30 ramps a control current for a QVFS valve up and down at a calibrated, sufficiently gradual rate, and then observes the gradients in clutch position, i.e., velocity. When these gradients cross thresholds, the null points are captured. This information is then used to adapt the calibrated Q vs. I curve to a given temperature.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A vehicle comprising:
    an engine;
    a transmission which is connected to the engine, and which includes:
        a clutch having a clutch actuator, wherein the clutch is applied via the clutch actuator using position-based control logic;
        a fluid pump; and
        a solenoid valve positioned downstream of the fluid pump and upstream of the clutch, wherein the solenoid valve is configured to output a flow rate (Q) for a corresponding solenoid control current (I); and
    a controller in communication with the clutch actuator, wherein the controller includes a processor with tangible, non-transitory memory on which is recorded instructions for adapting a calibrated Q vs. I characteristic table of the solenoid valve for different transmission temperatures, and wherein the processor is operable to execute the instructions only under predetermined conditions to thereby:
        apply closed-loop position control signals to the clutch actuator, using the position-based control logic, at the different transmission temperatures;
        record, at each of the different transmission temperatures, a null point describing the corresponding solenoid control current (I) at a zero flow rate (Q=0) condition;
        calculate an offset value for the corresponding solenoid control current (I) using the recorded null point;
        apply the offset value to the calibrated Q vs. I characteristic table to thereby adapt the calibrated Q vs. I characteristic table; and
        control the clutch using the adapted Q vs. I characteristic table.

2. The vehicle of claim 1, wherein the solenoid valve is a variable force flow control solenoid valve.

3. The vehicle of claim 1, wherein execution of the instructions causes the processor to adapt the Q vs. I characteristic table by adjusting a solenoid control current (I) axis of the calibrated Q vs. I characteristic table.

4. The vehicle of claim 1, wherein the processor is operable to apply the closed-loop position control signals to the clutch actuator by respectively stepping the solenoid control current (I) up and down at a calibrated rate until a position of the clutch actuator changes, and then recording the solenoid control current (I) at each of the positions as a plurality of the null points.

5. The vehicle of claim 4, wherein the plurality of null points corresponds to increasing and decreasing position of a spool portion of the solenoid valve, with decreasing position occurring during exhausting of the solenoid valve and increasing position occurring with filling of the solenoid valve.

6. The vehicle of claim 1, wherein the controller is configured to detect the predetermined condition as one of a park (P) setting of the transmission and an engine off condition.

7. The vehicle of claim 1, wherein the transmission is a dual-clutch transmission having a pair of input clutches, one of which is the clutch controlled via the solenoid valve, and wherein the predetermined condition is any gear state in which the clutch is not engaged.

8. The vehicle of claim 1, wherein the transmission is an automated-manual transmission (AMT), and wherein the predetermined condition is a park state of the AMT.

9. The vehicle of claim 1, further comprising a clutch position sensor that is positioned with respect to the clutch actuator, wherein the clutch position sensor is in communication with the processor.

10. A transmission comprising:
    a fluid pump;

a clutch in fluid communication with the fluid pump, wherein the clutch includes a clutch piston and a clutch position sensor, and wherein the clutch is applied via the clutch piston using closed-loop position control signals;

a variable-force solenoid (VFS) valve positioned downstream of the fluid pump and upstream of the clutch, and configured to output a flow rate (Q) for a corresponding solenoid control current (I); and a controller in communication with the clutch piston via the closed-loop position control signals, wherein the controller includes a processor with tangible, non-transitory memory on which is recorded instructions for adapting a calibrated Q vs. I characteristic table for different transmission temperatures, and wherein the processor is operable to execute the instructions only under predetermined conditions to thereby:

apply the closed-loop position control signals to the clutch actuator at two or more transmission temperatures;

record, at the two or more transmission temperatures, a null point describing the corresponding solenoid control current (I) of the VFS valve at a zero flow rate (Q=0) condition;

calculate an offset value for the corresponding solenoid control current (I) using the recorded null point;

apply the offset value to the calibrated Q vs. I characteristic table to thereby adapt the Q vs. I characteristic table; and control the clutch using the adapted Q vs. I characteristic table.

11. The transmission of claim 10, wherein execution of the instructions causes the processor to adapt the Q vs. I characteristic table by adjusting a solenoid control current (I) axis of the calibrated Q vs. I characteristic table.

12. The transmission of claim 10, wherein the application of the closed-loop position control signals includes respectively stepping the solenoid control current (I) up and down at a calibrated rate until a position of the clutch actuator changes, and then recording the solenoid control current (I) at each of the positions as a plurality of the null points.

13. The transmission of claim 12, wherein the plurality of null points correspond to increasing and decreasing position of a spool portion of the VFS valve, with decreasing position occurring during exhausting of the solenoid valve and increasing position occurring with filling of the VFS valve.

14. The transmission of claim 10, wherein the transmission is a dual-clutch transmission (DCT) having a pair of input clutches, one of which is the clutch controlled via the VFS valve, and wherein the predetermined condition is any gear state in which the clutch is not engaged.

15. The transmission of claim 10, wherein the transmission is an automated-manual transmission (AMT), and wherein the predetermined condition is a park state of the AMT.

16. A method for adapting a calibrated Q vs. I characteristic table for different transmission temperatures in a vehicle having a transmission with a clutch that is fed hydraulic fluid from a fluid pump via a solenoid valve, and that is controlled via closed-loop position control signals from a controller, the method comprising:

applying, during a predetermined condition, the closed-loop position control signals to the clutch via the controller at two or more transmission temperatures;

recording, via a processor of the controller at the two or more transmission temperatures, a null point describing a corresponding solenoid control current (I) of the solenoid valve at a zero flow rate (Q=0) condition;

calculating an offset value for the corresponding solenoid control current (I) using the recorded null point;

applying the offset value to the calibrated Q vs. I characteristic table at a measured transmission temperature to thereby adapt the Q vs. I characteristic table; and controlling the solenoid valve, via the controller, using the solenoid control current from the adapted Q vs. I characteristic table at the measured transmission temperature.

17. The method of claim 16, wherein the application of the closed-loop position control signals includes respectively stepping the solenoid control current (I) up and down at a calibrated rate until a position of the clutch actuator moves, and then recording the positions as a plurality of the null points.

18. The method of claim 16, wherein the transmission is a dual-clutch transmission having a first and a second input clutch, a designated one of which is the clutch that is controlled via the solenoid valve, the method further comprising: detecting the predetermined condition as any gear state in which the clutch is not engaged.

19. The method of claim 16, wherein the transmission is an automated-manual transmission (AMT), the method further comprising: detecting the predetermined condition as a park state of the AMT.

* * * * *